(12) United States Patent
Iraschko

(10) Patent No.: US 7,523,999 B2
(45) Date of Patent: Apr. 28, 2009

(54) BRAKE CYLINDER FOR MOTOR VEHICLE BRAKES

(75) Inventor: Johann Iraschko, Schweitenkirchen (DE)

(73) Assignee: Knorr-Bremse Systems fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/723,701

(22) Filed: Mar. 21, 2007

(65) Prior Publication Data

US 2007/0246313 A1   Oct. 25, 2007

Related U.S. Application Data

(63) Continuation of application No. PCT/EP2005/010114, filed on Sep. 20, 2005.

(30) Foreign Application Priority Data

Sep. 21, 2004   (DE) ................. 10 2004 046 028

(51) Int. Cl.
*B60T 17/16* (2006.01)
(52) U.S. Cl. .................. 303/89; 188/170; 92/63
(58) Field of Classification Search ............. 188/170, 188/166; 303/89; 92/63, 130 A, 130 R, 134
See application file for complete search history.

(56) References Cited

U.S. PATENT DOCUMENTS

| | | | |
|---|---|---|---|
| 3,188,922 A | 6/1965 | Cruse | |
| 3,710,692 A | 1/1973 | Valentine | |
| 3,717,072 A | 2/1973 | Kaltenthaler et al. | |
| 5,377,579 A | 1/1995 | Pierce | |

FOREIGN PATENT DOCUMENTS

| | | |
|---|---|---|
| DE | 22 18 070 | 11/1972 |
| DE | 25 31 547 | 4/1976 |
| DE | 35 03 216 A1 | 8/1986 |
| DE | 694 22 311 T2 | 2/1994 |
| DE | 198 30 136 A1 | 2/1999 |
| DE | 199 33 165 A1 | 1/2001 |

(Continued)

OTHER PUBLICATIONS

International Search Report dated Mar. 8, 2006.

*Primary Examiner*—Pam Rodriguez
(74) *Attorney, Agent, or Firm*—Crowell & Moring LLP

(57) ABSTRACT

A brake cylinder for brakes of a motor vehicle, in particular for utility vehicles, comprising a spring loaded brake section and a service brake section is configurable in such a way that a total length is substantially shortened. In the inventive cylinder, the spring loaded brake section and the service brake section are constructed in such a way that they form a single unit. The brake cylinder comprises a pressurized piston for service braking and a spring-loaded piston for parking braking. The two pistons are connected to each other through a shift cylinder and are disconnected by the pressure relief in a second pressure chamber through the shift cylinder in such a way that the piston is displaceable by a spring-loaded spring. In order to release the brake, the piston for service braking is pressurized and reconnected to the piston. The unit is displaced to a release position by the action of a return spring through the pressure relief of the piston. The inventive brake cylinder is particularly suitable for utility vehicles.

15 Claims, 3 Drawing Sheets

FOREIGN PATENT DOCUMENTS

| | | | | | |
|---|---|---|---|---|---|
| DE | 10 2004 042 992 A1 | 3/2006 | EP | 0 452 621 A1 | 10/1991 |
| EP | 0 020 862 | 1/1981 | FR | 2203731 | 5/1974 |
| | | | GB | 1 382 507 | 2/1975 |
| | | | GB | 1 514 755 | 6/1978 |

US 7,523,999 B2

BRAKE CYLINDER FOR MOTOR VEHICLE BRAKES

CROSS-REFERENCE TO RELATED APPLICATIONS

This application is a continuation of PCT International Application No. PCT/EP2005/010114, filed on Sep. 20, 2005, which claims priority under 35 U.S.C. §119 to German Application No. 10 2004 046 028.0, filed Sep. 21, 2004, the entire disclosures of which are expressly incorporated by reference herein.

BACKGROUND AND SUMMARY OF THE INVENTION

The invention relates to a brake cylinder for motor vehicle brakes, in particular for brakes of commercial vehicles.

In order to generate the necessary great brake forces, commercial vehicles are equipped with brakes which are actuated by compressed air. What is known as the service brake is actuated here by way of compressed air cylinders, preferably in the form of diaphragm cylinders. In contrast, the parking brake cannot be actuated with the compressed air cylinder, as there is a legal requirement which states that parking brakes may only act mechanically, as only in this way is a constant brake force ensured over a practically unlimited time period. In the case of brakes which are loaded with compressed air, a drop in the brake force can namely occur as a result of leakages.

For this reason, the brakes of commercial vehicles are equipped with what are known as spring cylinders. Here, the brake actuating force is generated via a stressed spring. This, therefore, satisfies the requirement of a mechanically acting parking brake. As these spring cylinders have very high forces available as a rule, manual release in the service case is no longer appropriate. The release of the parking brake therefore takes place by means of compressed air. In order to make this possible, spring cylinders are equipped with a release piston. It is possible by way of this piston to compress the spring upon introduction of compressed air to such an extent that the brake is released. In order that the parking brake is not engaged during driving, the piston is loaded continuously with compressed air, with the result that the spring cannot relax and the parking brake therefore does not become active.

A parking brake is usually required only on one axle; this is the rear axle as a rule. The brakes on the rear axle are therefore equipped with what are known as combined cylinders. A combined cylinder comprises in practice two different cylinder types, namely a spring cylinder for the parking brake and a compressed air cylinder for the service brake. This is usually a diaphragm cylinder.

The two cylinders are usually arranged one behind another in the axial direction. The spring cylinder, which acts by way of its piston rod on the piston collar of the diaphragm cylinder and from this on the brake lever, is arranged behind the diaphragm part of the combined cylinder.

A disadvantage of this design is that a relatively large amount of installation space is required. It is, therefore, frequently very difficult to install these combined cylinders on front axles on account of the steering kinematics. The difficulties are increased still further as a result of the introduction of more complex chassis systems, such as individual wheel suspension systems. However, on account of the increasing requirements of the performance of the parking brake system, there is increasingly the desire to also install parking brakes on the front axle. However, this can frequently not be realized with the customary combined cylinders, which have been described above.

The present invention is based on the object of developing designs for combined cylinders which require considerably less installation space.

This and other objects are achieved by a brake cylinder for motor vehicle brakes, in particular for brakes of commercial vehicles, having a spring brake section, in particular for carrying out parking brake operations by means of a spring force accumulator spring, and a service brake section for carrying out service brake operations which are actuated by compressed air, the spring brake section and the service brake section being combined to form one structural unit, the brake cylinder being divided into two chambers by a piston, one of the two chambers serving as a pressure chamber for actuating the service brake, and the spring force accumulator spring of the spring section being arranged in a further chamber on the opposite side of the piston. A configuration is provided such that the spring force accumulator spring is releasable by ventilation of a second pressure chamber. The spring force accumulator spring acts on a further piston, which can be locked with respect to the piston by way of a locking mechanism, and can be released from the piston by release of the locking mechanism, and which is connected to a piston rod for actuating the vehicle brake directly or via further elements. The spring force accumulator spring acts between the two pistons after the release of the locking mechanism and displaces the two pistons relative to one another during a parking brake operation.

In contrast to the previously known embodiments, the present invention makes possible a structural design of the brake cylinder wherein the spring cylinder may be released by actuation of the cylinder for the service brake. The brake cylinder according to the invention could also be called a "short length combined" cylinder.

In one preferred embodiment, there is provision for the brake cylinder to be divided into two chambers by a piston, one of the two chambers serving as a pressure chamber for actuating the service brake, and the spring force accumulator spring of the spring section being arranged in the further chamber on the opposite side of the piston. However, this further chamber remains pressureless during actuation of the service brake and also during actuation of the parking brake. Furthermore, a restoring spring for the service brake is arranged in this further chamber on the opposite side of the piston. This design satisfies the requirements for a compact construction.

The brake cylinder is also equipped with a second pressure chamber. The design is selected in such a way that the spring force accumulator spring can be released by ventilation, that is to say by the dissipation of pressure in this second pressure chamber. The structurally simple solution results if the spring force accumulator spring acts on a further piston which can be locked with respect to the piston for the service brake by means of a locking mechanism and can be released from said piston by release of the locking mechanism, and which is connected to a piston rod for actuating the vehicle brake directly or via further elements, the spring force accumulator spring acting between the two pistons after the release of the locking mechanism and displacing said two pistons relative to one another during a parking brake operation.

There is provision here, during the parking brake operation, for the piston which is loaded by the spring force accumulator spring to be capable of displacement relative to the piston for the service brake operation. As has already been mentioned, it is particularly advantageous that, in order to release the piston which is loaded by the spring force accumulator spring, first of all the piston for the service brake operation can be moved in the direction of the piston for the parking brake, that the locking mechanism can be closed subsequently, and that subsequently both pistons can be moved into the release position by way of the restoring spring by pressure relief of the piston for the service brake operation. Accordingly, the piston for the service brake operation has a dual function, namely the actuation of the brake during driving and the restoring of the spring-loaded piston into the release position. The locking mechanism is closed by the application of pressure to the piston which is loaded by the spring force accumulator spring, at the very latest after the release position has been reached. This expediently takes place when the piston for the service brake operation is moved into the position for driving the piston for the parking brake operation.

If, however, only the piston for the parking brake operation is to be moved, first of all the locking mechanism has to be released. This expediently takes place by pressure relief of the piston for the parking brake operation.

In a structurally simple manner, the locking mechanism includes two conical faces which make contact with one another in the locked position. Here, one conical face is arranged on the piston for the service brake operation and the other conical face is arranged on a switching cylinder which is operatively connected to the second pressure chamber. The conical faces are formed in such a way that the conical face, which is assigned to the piston for the service brake operation, increases in the moving direction of the two pistons. The cone angle is relatively small, with the result that the conical faces can become clamped. The switching cylinder is expediently configured in two pieces and includes a switching ring which lies facing the piston for the service brake operation and a switching cup which lies facing away from the piston for the service brake operation, the switching cup containing the second pressure chamber for actuating the locking mechanism.

In order to release the locking mechanism, there is provision for an annular chamber to be provided between the piston for the parking brake operation and the switching ring, in which annular chamber a compression spring is inserted which is supported at one end on an inwardly oriented collar of the piston and at the other hand on an outwardly oriented collar of the switching ring. As soon as the second pressure chamber is ventilated, that is to say becomes pressureless, the spring becomes active and releases the locking mechanism, or the two conical faces move out of contact. In order that the second pressure chamber is completely sealed off, there is provision for the switching ring and the switching cup to overlap, and for a seal to be introduced into this region.

There is provision according to a second embodiment for the piston, which is loaded by the spring force accumulator spring, to be in engagement with a threaded spindle which is operatively connected to a brake in such a way that, in the release state of the brake cylinder, the spindle is secured against rotation by the applied brake force, and that the threaded spindle is capable of rotation as a result of the reduction or cancellation of the brake force, with the result that the piston can be moved in the longitudinal direction of the spindle as a result of the relief of the spring force accumulator spring.

In this embodiment, the force which acts from the spring force accumulator spring can be regulated.

There is also provision in this embodiment for the threaded spindle not to be self-locking, and for it to be possible for the frictional force of the brake to be regulated by use of a control piston, which can be loaded with pressure. The pitches of the threads of the threaded spindle are accordingly very high, with the result that the adjusting speed of the spring-loaded piston is correspondingly high.

In order to transfer the brake cylinder from the parking brake operation into the release position, there is provision for it to be possible for the threaded spindle to be driven rotationally. As a result, the spring-loaded piston which is in engagement with the threaded spindle is moved along the spindle in the direction of the piston for the parking brake operation. As in the embodiments which were described first of all, the service brake operation takes place by the application of pressure to the corresponding piston.

Other objects, advantages and novel features of the present invention will become apparent from the following detailed description of the invention when considered in conjunction with the accompanying drawings.

DETAILED DESCRIPTION OF THE DRAWINGS

Figure 1:
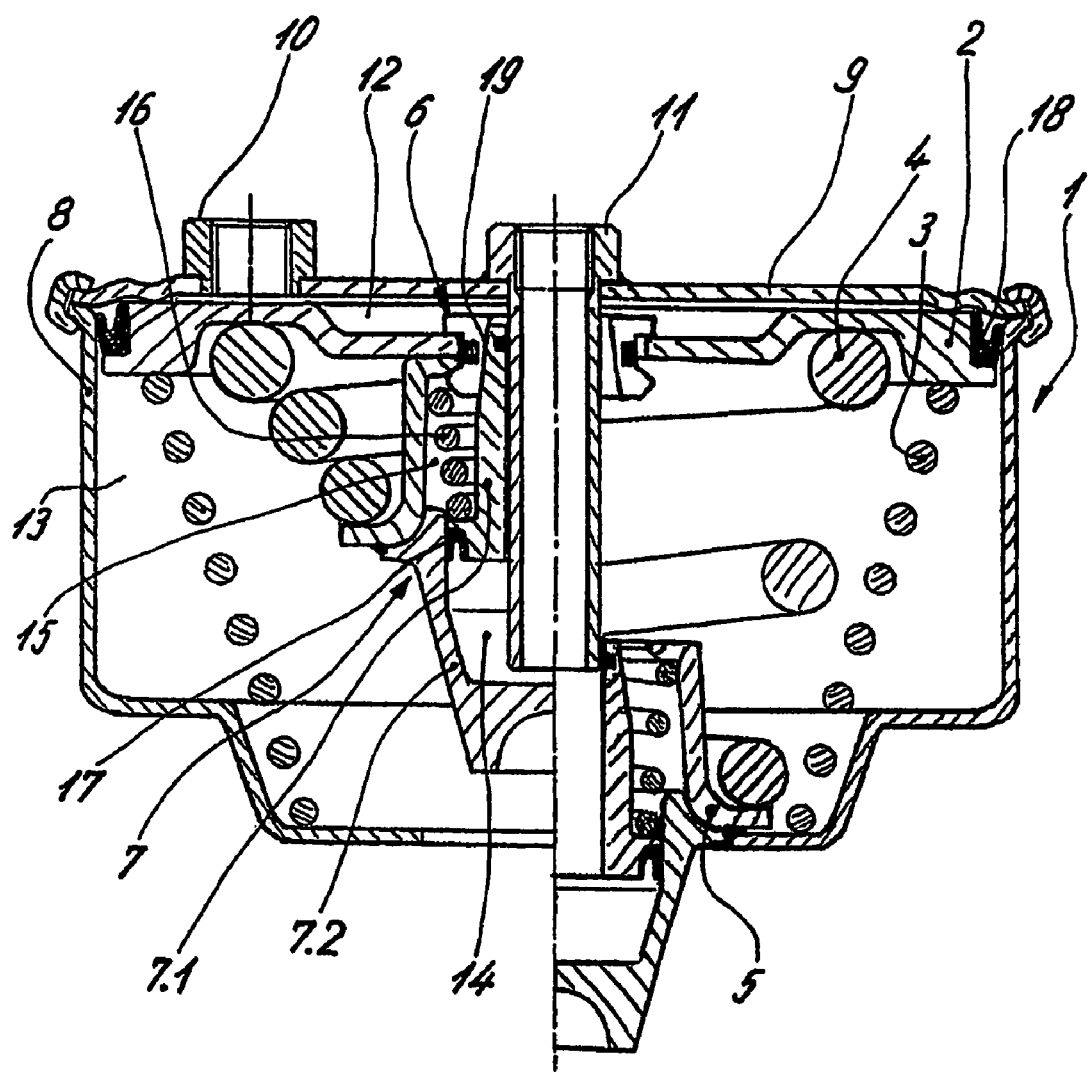
FIG. 1 shows the brake cylinder according to the invention in a half section, in the release position and in the parking brake position.
Figure 2:
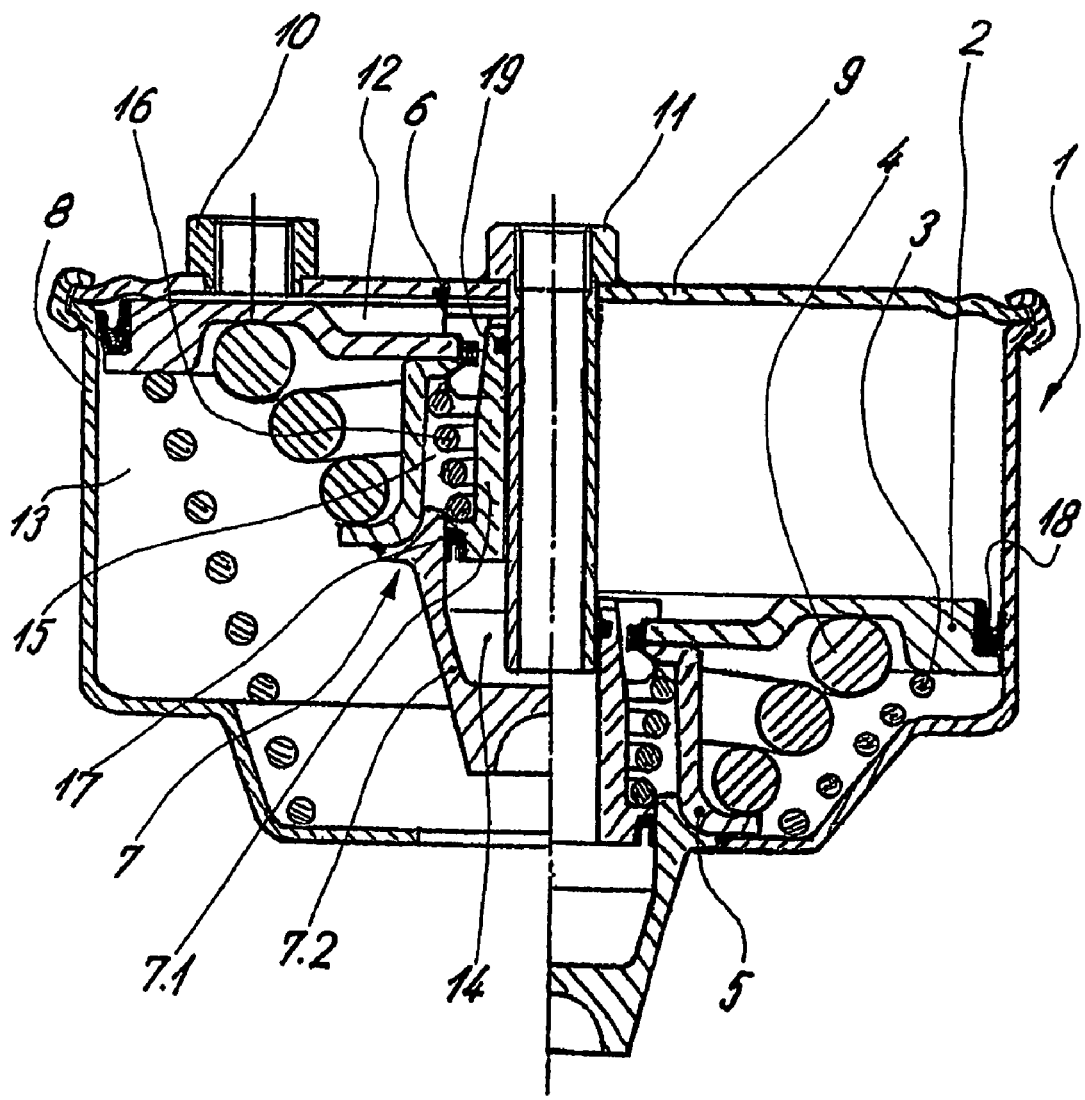
FIG. 2 shows an illustration which corresponds to FIG. 1, but with the pistons coupled to one another in order to engage the release position.
Figure 3:
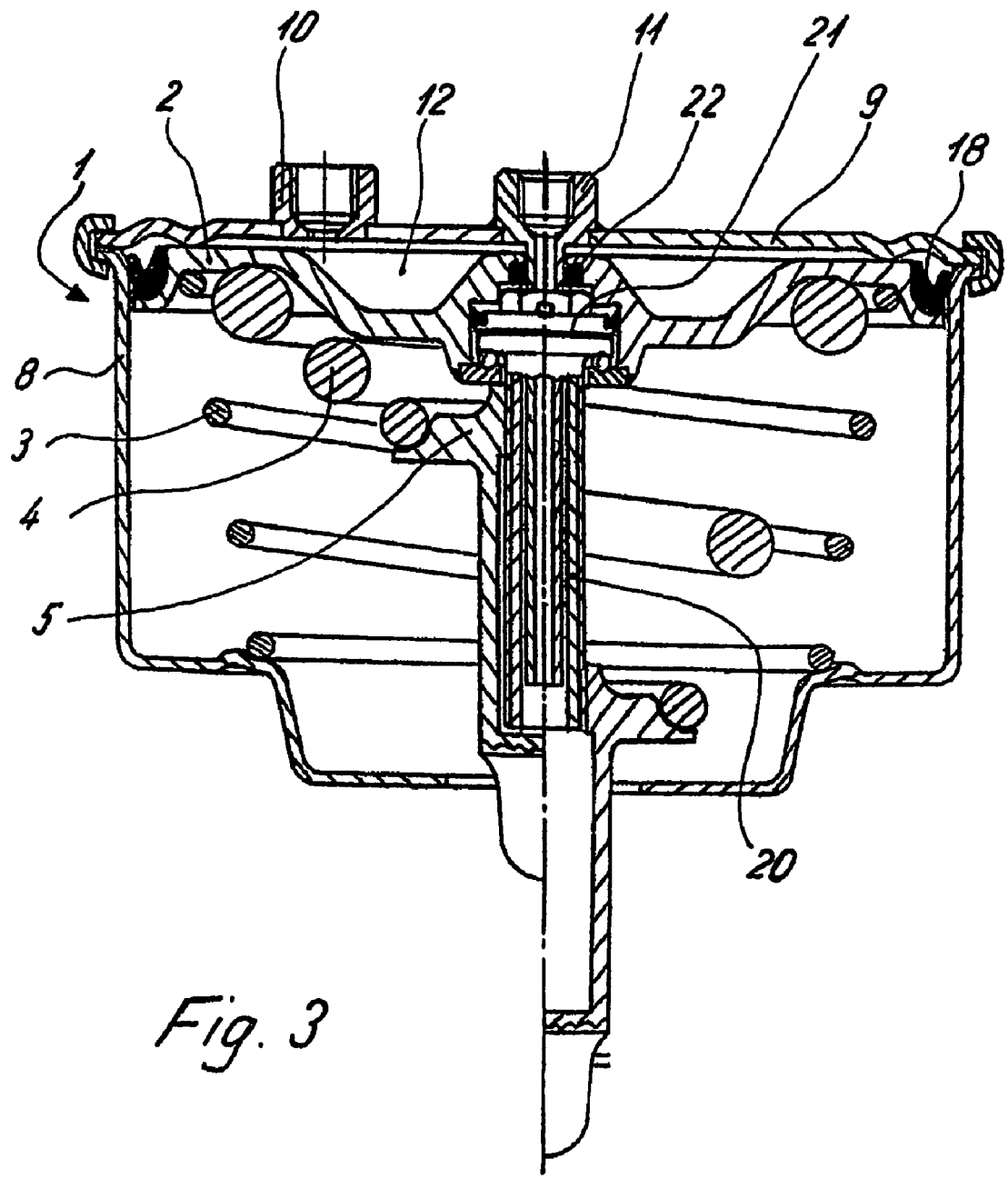
FIG. 3 shows a further embodiment of the brake cylinder according to the invention in a half-sectional illustration.

The brake cylinder 1, which is shown in FIGS. 1 to 3, includes a cup-shaped housing 8, in which the functional parts are mounted which are explained in still further detail. The cup-shaped housing 8 is closed by a cover 9, which is provided with two compressed air connections 10, 11. The compressed air connection 11 is provided centrally and for the parking brake operation, while the compressed air connection 10 is provided for the service brake operation. A piston 2 is arranged in the cup-shaped housing 8, the diameter of said piston 2 corresponding to the internal diameter of the housing. This piston 2 can be loaded with compressed air through the compressed air connection 10, and the compressed air can also flow out through said compressed air connection 10.

As the figures show, the piston 2 is recessed in the central region, with the result that a pressure chamber 12 is produced. A further chamber 13 is also delimited by the piston 2, in which chamber 13 a conical restoring spring 3 and a spring force accumulator spring 4 are inserted. This chamber 13 is delimited by the housing 8, a piston 5 which is loaded by the spring force accumulator spring 4 and a switching cup 7.2 which is part of a switching cylinder 7.

The switching cylinder 7 also includes a switching ring 7.1, which extends approximately concentrically with respect to the piston 5. As a result, an annular chamber 15 is formed by the switching ring 7.1 and the piston 5, into which annular chamber 15 a compression spring 16 is inserted. The piston 5 is of a Z-shaped design in vertical section, with the result that the compression spring 16 is supported on an inwardly oriented collar at the upper end which faces the piston 2, while the opposite end of the compression spring 16 is supported on an outwardly oriented collar of the switching ring 7.1. The second pressure chamber 14 is delimited by the inner face of the switching cup 7.2 and the facing end face of the switching ring 7.1. The end regions of the switching ring 7.1 and the switching cup 7.2, which face one another, overlap, and a seal 17 is inserted into this region. The piston 2 and the associated edge of the switching ring 7.1 are coupled to one another by a locking mechanism 6, in order to couple or to decouple the piston 5 to/from the piston 2, as will be explained in the following text. The piston 2 is sealed with respect to the housing 8 by way of a seal 18. According to the exemplary embodiment according to FIGS. 1 and 2, the locking mechanism 6 includes two conical faces 19, one conical face being the piston 2 and the other conical face being a face of the switching ring 7.1.

The spring brake section comprises substantially the spring force accumulator spring 4 and the piston 5. The service brake section comprises substantially the piston 2 and the pressure chamber 12. The housing 8 is assigned jointly to both sections.

In FIGS. 1 and 2, the half sections on the left show the brake cylinder 1 in the nonactivated state, that is to say no brake operation takes place. In FIG. 1, the half-section on the right shows the position of the piston 5 which is loaded by the spring force accumulator spring 4 in the brake position. If the commercial vehicle is still ready for driving, that is to say the compressed air brake system is in operation, the second pressure chamber 14 is at a predefined pressure. If the brake cylinder 1 is then activated for a parking brake operation, the second pressure chamber 14 first of all becomes pressureless. As a result of the effect of the compression spring 16, the switching ring 7.1 of the switching cylinder 7 is displaced by a defined amount in its longitudinal direction, as a comparison of the two half sections shows. As a result, decoupling takes place between the piston 2 for the service brake operation and the piston 5 for the parking brake operation. As soon as this decoupling has been carried out, the spring force accumulator spring 4 relaxes and presses the switching piston 7 into the position which is shown on the right in FIG. 1.

In order to release the parking brake operation, first of all the piston 2 is loaded with pressure by the introduction of compressed air into the pressure chamber 12. As a result, said piston 12 moves into the position which is shown in the sectional illustration on the right, that is to say the conical faces 19 come into contact again and the pistons 2 and 5 are coupled to one another. In order to reach this position, the force which acts on the piston 2 and the force which is applied by the spring force accumulator spring 4 are adapted to one another. As the second pressure chamber 14 is pressureless during the parking brake operation, it is loaded with pressure again for release. As a result, coupling of the two pistons 2 and 5 takes place. Subsequently, the pressure chamber 12 is ventilated, that is to say made pressureless, with the result that the pistons 2 and 5 are guided back by the restoring spring 3 into the positions which are shown in the half sections on the left. This process can be repeated as often as desired. The parking brake therefore achieves full functionality without restriction.

This solution has significant advantages over other known proposals, for example with what are known as locking systems of the brake or of the brake cylinder. For instance, the spring force accumulator spring 4 is completely independent of the function of the piston 2 for the service brake operation. In contrast to the locking solutions, decreasing forces during the parking brake operation are avoided by the prestressed spring 4. These decreasing forces are caused by settling and shrinking effects. Moreover, the solution is extremely reliable, as the parking brake operation can also be initiated if the cylinder for the service brake operation is not capable of functioning. The figures show that the brake cylinder 1 includes a spring brake section and a service brake section which form one structural unit. As a result, the overall size is reduced substantially in comparison with known embodiments.

The embodiment according to FIG. 3 operates without the switching cylinder. The piston 5 is of sleeve-shaped design and equipped with a threaded spindle 20 which surrounds the compressed air supply channel. The threaded spindle 20 is not self-locking, but is coupled to a brake 21, to a friction brake in the exemplary embodiment which is shown. The friction force is generated by compressed air piston 22. As a result, it is possible for the force which is applied by the brake 21 to be controlled. The brake 21 is activated in the position on the left, with the result that the threaded spindle 20 is secured against rotation. If the piston 5 is then to be transferred into the parking brake position, which is shown in the illustration on the right, the force which is applied by the brake 21 is reduced, and the force which is applied by the spring force accumulator spring 4 causes the threaded spindle 20 to rotate as a result if a defined brake force is undershot. The rotational speed can be regulated by the brake force, with the result that the linear movement of the piston 5 can also be controlled.

In order to release the brake position, the pressure chamber 12 is loaded with pressure in accordance with the preceding embodiment. As the compressed air pistons 22 are pressureless, the threaded spindle 20 can rotate, with the result that the piston 5 can move back into the initial position counter to the action of the spring force accumulator spring 4.

It is also to be mentioned that the piston 5 is coupled to the brake (not shown) via a lever or via a linkage.

The invention is not restricted to the exemplary embodiments which are shown. It is only essential that the brake cylinder 1 comprises a spring brake section and a service brake section, and that these two sections are combined to form one structural unit. Moreover, it is advantageous that, in order to initiate the release process of the brake cylinder 1 or the brake, the piston 2 for the service brake operation is activated, and that coupling to the second brake cylinder 5 for the parking brake operation takes place in the first embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake cylinder for a brake of a motor vehicle, the brake cylinder having a spring brake section performing parking brake operations via a spring force accumulator spring and a service brake section for performing service brake operations via compressed air actuation, the spring brake and service brake sections being combined into one structural unit, the brake cylinder comprising:

a first piston arranged in the brake cylinder;
first and second pressure chambers, the first chamber serving to actuate the service brake;
a further chamber located on an opposite side of the first piston from the first pressure chamber, the first piston dividing the brake cylinder between the first pressure chamber and the further chamber, wherein the spring force accumulator spring is arranged in the further chamber on the opposite side of the piston;
a second piston acted upon by the spring force accumulator spring, the spring force accumulator spring being releasable upon ventilating of the second pressure chamber;

a locking mechanism for locking and releasing the second piston with respect to the first piston, the second piston being coupled for actuating the brake either directly or indirectly;

wherein the spring force accumulator spring acts between the first and second pistons after release of the locking mechanism and displaces the first and second pistons relative to one another during a parking brake operation.

2. The brake cylinder as claimed in claim 1, further comprising a restoring spring for the service brake arranged in the further chamber on the opposite side of the first piston.

3. The brake cylinder as claimed in claim 1, wherein, during the parking brake operation, the second piston which is loaded by the spring force accumulator spring, is displaceable relative to the first piston for the service brake operation.

4. The brake cylinder as claimed in claim 2, wherein, in order to release the second piston loaded by the spring force accumulator spring, first the first piston for the service brake operation is moved in the direction of the second piston, and further wherein the locking mechanism is closeable by applying pressure to the second pressure chamber, and still further wherein subsequently both pistons are movable into the release position by the restoring spring by pressure relief of the first piston.

5. The brake cylinder as claimed in claim 4, wherein the locking mechanism is closeable by applying pressure to the second piston which is loaded by the spring force accumulator spring.

6. The brake cylinder as claimed in claim 1, wherein, in order to move the second piston which is loaded by the spring force accumulator spring for the parking brake operation, the second piston can be relieved of pressure in order to release the locking mechanism.

7. The brake cylinder as claimed in claim 1, wherein the locking mechanism is formed from two conical faces, which make contact with one another in a locked position.

8. The brake cylinder as claimed in claim 1, wherein the second pressure chamber lies within a switching cylinder, and further wherein the switching cylinder is operatively configured in two pieces and comprises a switching ring which lies facing the first piston for the service brake operation and a switching cup which lies facing away from the first piston.

9. The brake cylinder as claimed in claim 8, wherein the second pressure chamber is provided for locking the locking mechanism in the switching cup.

10. The brake cylinder as claimed in claim 9, further comprising an annular chamber provided between the second piston and the switching ring, in which annular chamber a compression spring is inserted, which is supported at one end on an inwardly oriented collar of the second piston and at the other end on an outwardly oriented collar of the switching ring.

11. The brake cylinder as claimed in claim 9, wherein the switching ring and the switching cup overlap, and further wherein a seal is introduced into the overlapping region.

12. The brake cylinder as claimed in claim 1, wherein the second piston is in engagement with a threaded spindle, which is operatively connected to a brake such that, in a release state of the brake cylinder, the spindle is secured against rotation by the applied brake force, and further wherein the threaded spindle is capable of rotation as a result of a reduction or cancellation of the brake force, with a result that the second piston is movable in a longitudinal direction of the threaded spindle as a result of the relief of the spring force accumulator spring.

13. The brake cylinder as claimed in claim 12, wherein the threaded spindle is not self-locking, and further wherein a frictional force of the brake is regulated via a compressed air piston, which is loadable with compressed air.

14. The brake cylinder as claimed in claim 1, wherein, in order to transfer the second piston from the parking brake position into the release position, the threaded spindle is driven rotationally.

15. A brake cylinder for a brake of a motor vehicle, the brake cylinder having a spring brake section performing parking brake operations via a spring force accumulator spring and a service brake section for performing service brake operations via compressed air actuation, the spring brake and service brake sections being combined into one structural unit, the brake cylinder comprising:

a first piston arranged in the brake cylinder;

first and second pressure chambers, the first pressure chamber serving to actuate the service brake, and the second pressure chamber lying within a switching cylinder, the switching cylinder being operatively configured in two pieces and comprising a switching ring which lies facing the first piston for the service brake operation and a switching cup which lies facing away from the first piston;

a further chamber located on an opposite side of the first piston from the first pressure chamber, the first piston dividing the brake cylinder between the first pressure chamber and the further chamber, wherein the spring force accumulator spring is arranged in the further chamber on the opposite side of the piston;

a second piston acted upon by the spring force accumulator spring, the spring force accumulator spring being releasable upon ventilating of the second pressure chamber;

a locking mechanism for locking and releasing the second piston with respect to the first piston, the second piston being coupled for actuating the brake either directly or indirectly; and an annular chamber provided between the second piston and the switching ring, in which annular chamber a compression spring is inserted, which is supported at one end on an inwardly oriented collar of the second piston and at the other end on an outwardly oriented collar of the switching ring, wherein the spring force accumulator spring acts between the first and second pistons after release of the locking mechanism and displaces the first and second pistons relative to one another during a parking brake operation.

* * * * *